United States Patent [19]

Schmitt

[11] Patent Number: 4,474,412
[45] Date of Patent: Oct. 2, 1984

[54] BRAKE CYLINDER PRESSURE MAINTAINING VALVE

[75] Inventor: Eugene W. Schmitt, Lockport, Ill.

[73] Assignee: Sloan Valve Company, Franklin Park, Ill.

[21] Appl. No.: 309,778

[22] Filed: Oct. 9, 1981

Related U.S. Application Data

[63] Continuation-in-part of Ser. No. 208,875, Nov. 21, 1980, abandoned.

[51] Int. Cl.³ ............................................. B60T 15/22
[52] U.S. Cl. ......................................... 303/33; 303/63
[58] Field of Search ..................................... 303/28–30, 303/33–36, 46, 44, 48, 57–67, 80, 81, 85, 86, 43, 40, 47, 23 R, 23 A, 25–27, 37, 38, 39, 49, 84 R, 84 A, 13, 14; 188/347, 351

[56] References Cited

U.S. PATENT DOCUMENTS

| | | | | |
|---|---|---|---|---|
| 2,846,270 | 8/1958 | Cook | ...................................... | 303/46 |
| 3,169,801 | 2/1965 | Racki | ................................. | 303/40 X |
| 3,300,255 | 1/1967 | Racki | ................................. | 303/40 X |
| 3,734,575 | 5/1973 | Paginton | ................................. | 303/33 |
| 4,127,308 | 11/1978 | McEathron | ....................... | 303/57 X |

Primary Examiner—Douglas C. Butler
Attorney, Agent, or Firm—Kinzer, Plyer, Dorn & McEachran

[57] ABSTRACT

A railroad air brake system for truck mounted air brakes includes an ABDW valve and auxiliary and emergency reservoirs with pipe connections therebetween. There is a brake pipe and a connection between the brake pipe and the ABDW valve. Truck mounted brake cylinders are located at each truck and a brake cylinder pipe connects the brake cylinders with the ABDW valve. A brake cylinder pressure maintaining valve is connected to the brake pipe, brake cylinder pipe and volume reservoir, as well as to the emergency reservoir. The brake cylinder pressure maintaining valve operates to provide air from the volume reservoir to the brake cylinder pipe and thus the brake cylinders when pressure in the brake cylinder pipe drops below a predetermined level, thus insuring a minimum brake application pressure, regardless of the piston travel of the brake cylinders.

10 Claims, 8 Drawing Figures

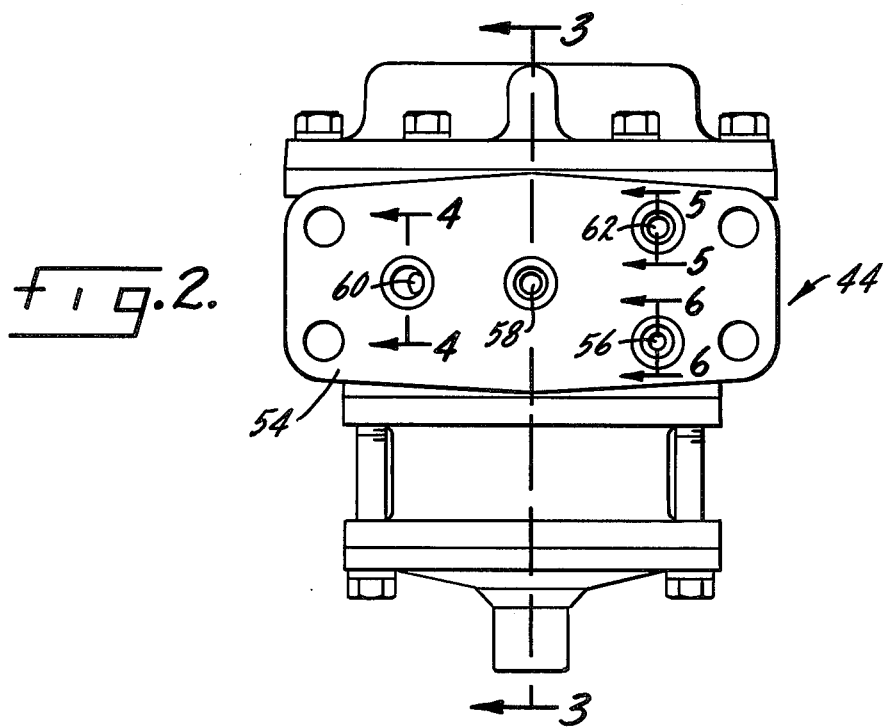
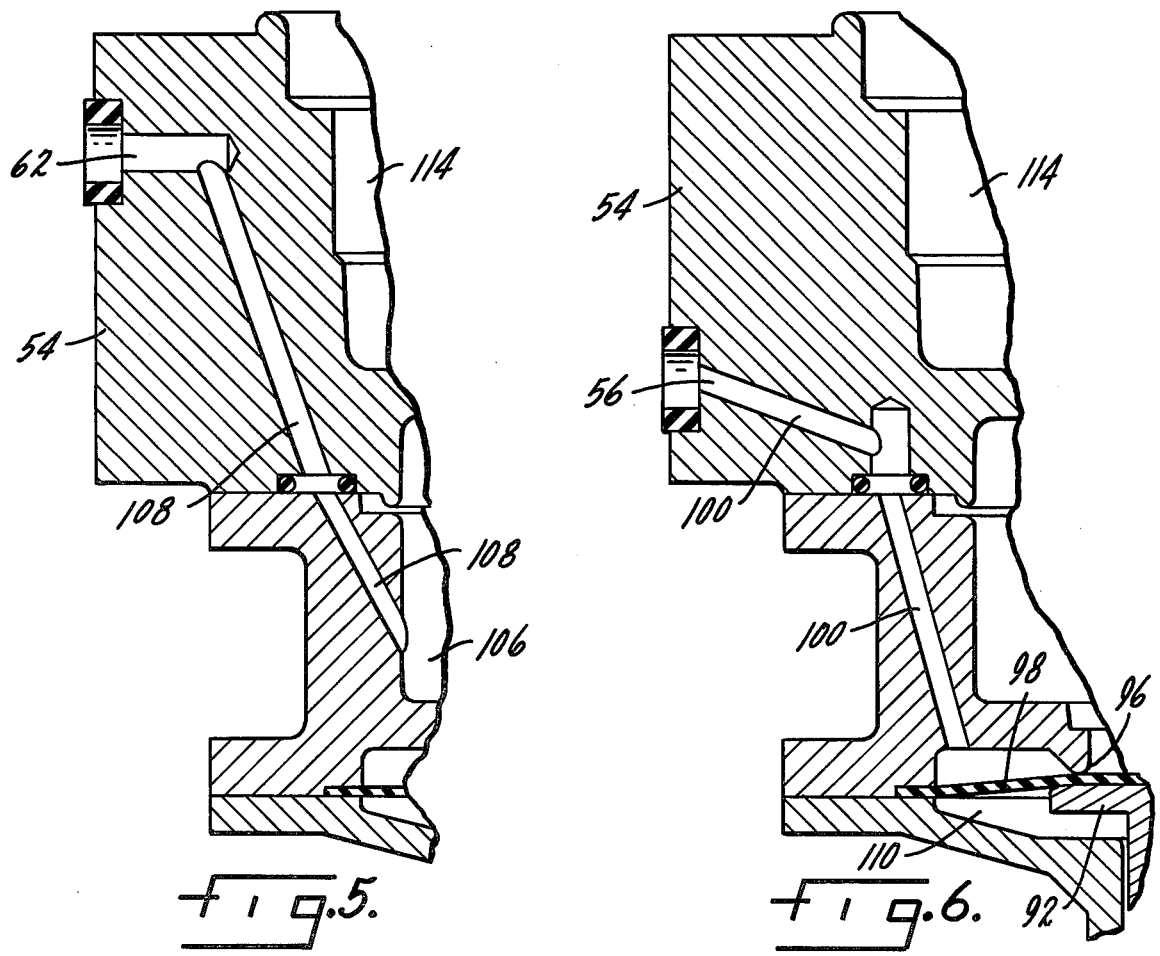

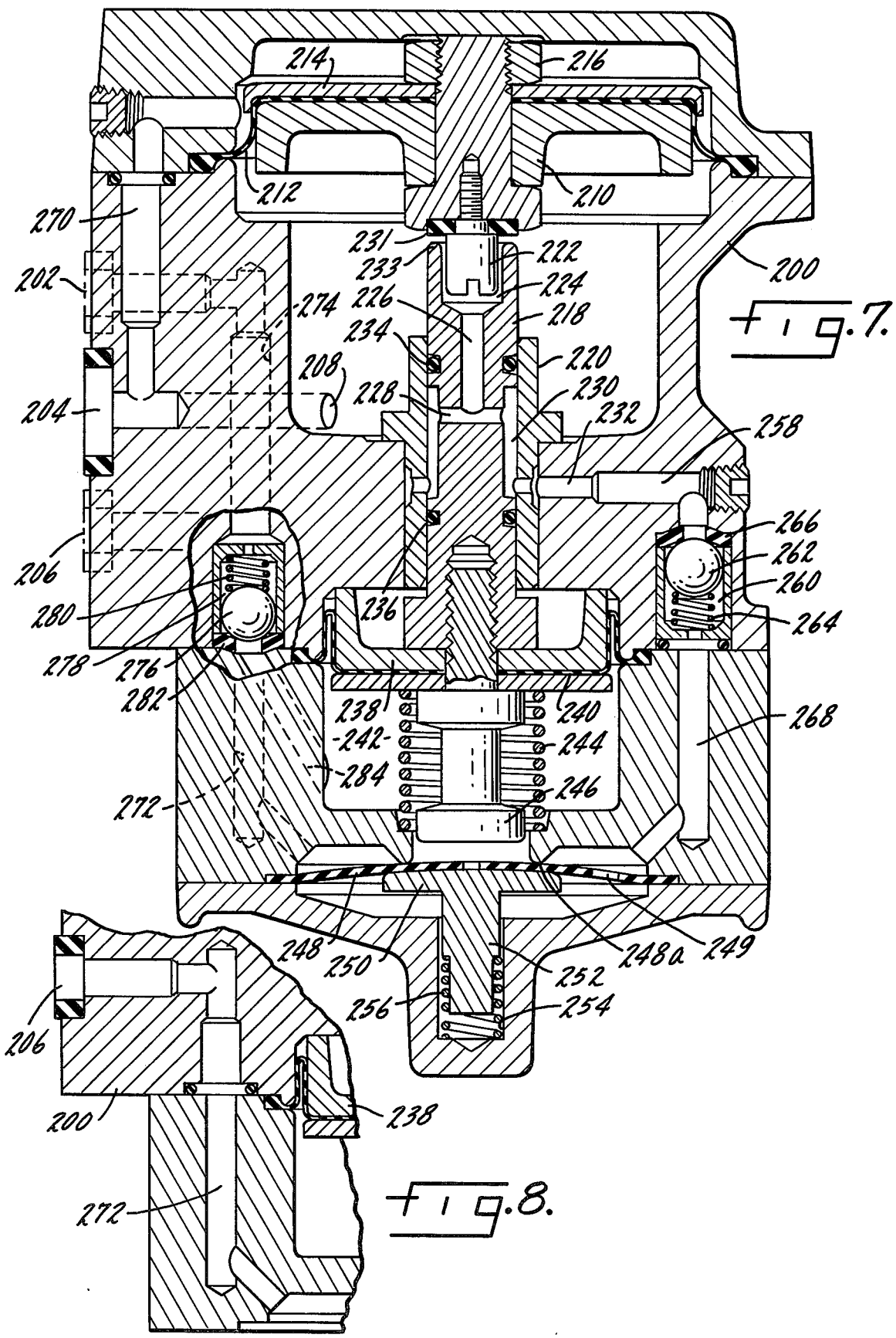

BRAKE CYLINDER PRESSURE MAINTAINING VALVE

This is a continuation-in-part of application Ser. No. 208,875 filed Nov. 21, 1980, now abandoned.

SUMMARY OF THE INVENTION

The present invention relates to truck mounted air brakes for railroad cars and is particularly related to a brake cylinder pressure maintaining valve which is effective to maintain minimum operating pressure in the brake cylinders regardless of brake cylinder piston travel.

Another purpose of the invention is a brake cylinder pressure maintaining valve which permits the use of thicker brake shoes, then heretofore in common use, on truck mounted air brakes.

Another purpose is a railroad car air brake system providing means for maintaining a controlled brake cylinder air pressure during normal and emergency brake applications on truck mounted railroad car brakes.

Another purpose is a simply constructed reliably operable valve which is effective to maintain a controlled brake cylinder pressure by connecting the brake cylinder pipe to an additional reservoir or volume reservoir forming a part of the car brake rigging.

Another purpose is a brake system of the type described utilizing a volume reservoir in conjunction with a brake cylinder pressure maintaining valve to provide and maintain a controlled brake cylinder air pressure, regardless of the piston travel of the brake cylinders and regardless of the wear condition of the brake shoes.

Other purposes will appear in the ensuing specification, drawings and claims.

BRIEF DESCRIPTION OF THE DRAWINGS

The invention is illustrated diagrammatically in the following drawings wherein:

FIG. 2 is a plan view of a brake cylinder pressure maintaining valve of the type utilized in the system of FIG. 1, FIG. 5 is a section along plane 5—5 of FIG. 2, FIG. 6 is a section along plane 6—6 of FIG. 2, FIG. 7 is a section illustrating a modified form of a brake cylinder pressure maintaining valve, and FIG. 8 is a partial section illustrating a portion of the valve hidden from view in the illustration of FIG. 7.

DESCRIPTION OF THE PREFERRED EMBODIMENT

The present invention relates to railroad car air brakes and in particular to truck mounted brakes. In conventional brake rigging brake cylinder pressure is controlled and maintained through the use of a double acting automatic slack adjuster which controls the piston travel stroke by adjusting the brake rigging to take into account wear on the brake shoes and wheels. On a car with a truck mounted direct acting brake assembly, there is no slack adjuster to compensate for wear on the brake shoes and wheels. Therefore, brake cylinder pressure can only be controlled by limiting the piston travel stroke by restricting the thickness of the brake shoes which can be used.

The present invention provides a means for maintaining and controlling brake cylinder air pressure on truck mounted brakes without regard to shoe thickness, thus permitting thicker brake shoes than heretofore in common use. Conventionally, shoes for truck mounted brakes are 1¼ inch thick and they will be replaced with shoes having a thickness of 1½ inches. The cost of standard two inch shoes is only slightly more, and although a two inch shoe can provide approximately 47 percent additional wear, it cannot be used in conventional truck mounted brake rigging because of the required additional piston travel. The present invention provides a means for maintaining air pressure regardless of the piston stroke, thus permitting the use of standard brake shoes in truck-mounted brakes with subsequent cost benefits outlined above.

Figure 1:
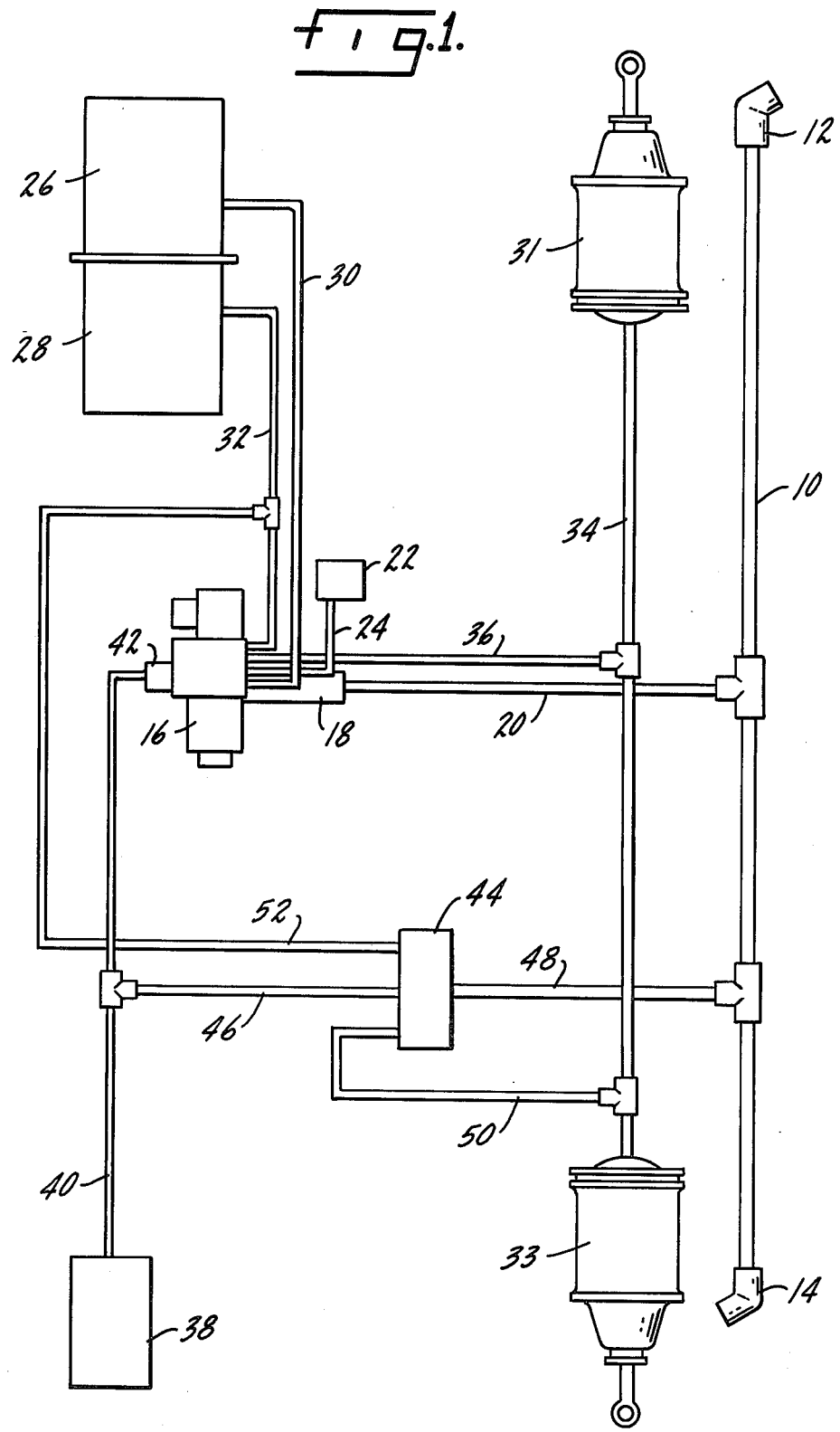
FIG. 1 is a diagrammatic illustration of a brake system of the type described.
Figure 3:
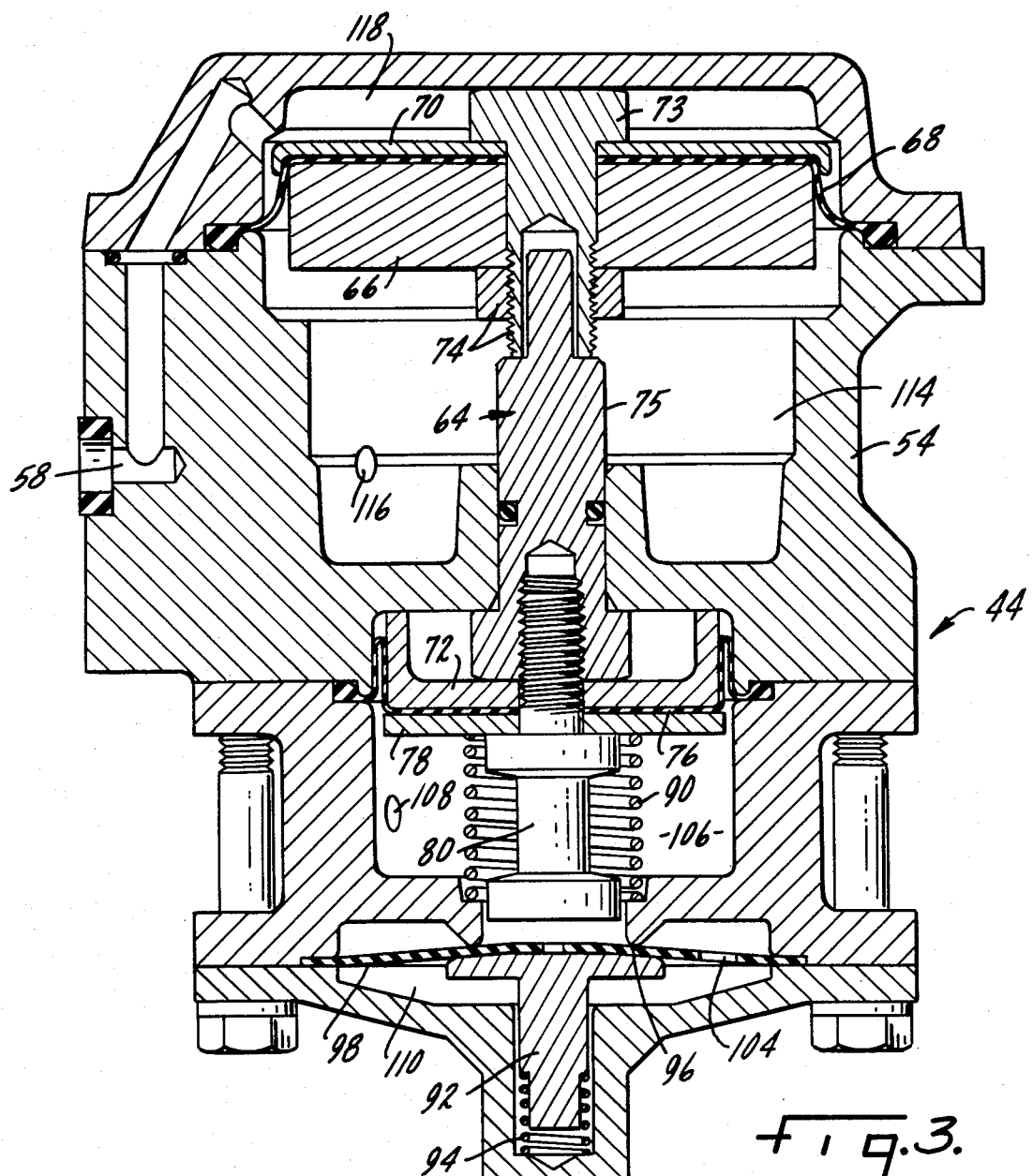
FIG. 3 is a section along plane 3—3 of FIG. 2.
Figure 4:
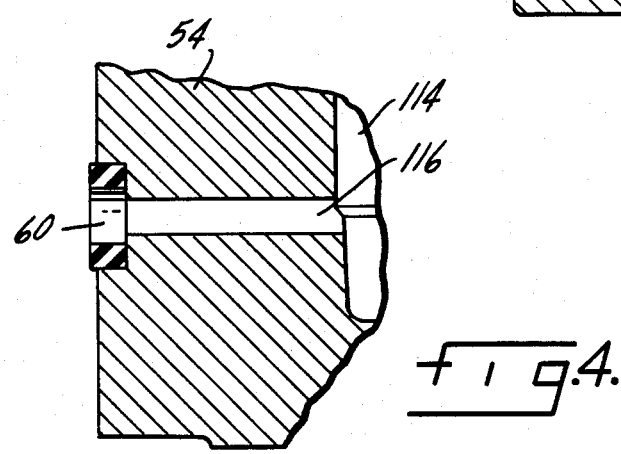
FIG. 4 is a section along plane 4—4 of FIG. 2.

In FIG. 1, the brake pipe is indicated at 10 and there will be the customary angle cocks 12 and 14 positioned on opposite ends of the brake pipe on a particular car. An ABDW valve of conventional construction is indicated at 16 and its dirt collector 18 is connected by a pipe 20 to brake pipe 10. A retainer valve is indicated at 22 and will be connected by a pipe 24 to the ABDW valve. An auxiliary reservoir 26 and an emergency reservoir 28 will be connected by conventional pipes 30 and 32 respectively to the ABDW valve. A brake cylinder pipe 34 is connected by a pipe 36 to the ABDW valve 16 and to diagrammatically illustrated brake cylinders 31 and 33. All of the above-described brake rigging is conventional.

A volume reservoir 38 which may for example have a volume of 2300 cubic inches, although the invention should not be so limited, is connected by a pipe 40 to the reservoir charging check valve 42 which will conventionally be a part of the ABDW valve. A brake cylinder pressure maintaining valve (BCPMV) is indicated at 44 and is connected by a pipe 46 to volume reservoir 38; by a pipe 48 to brake pipe 10; by a pipe 50 to brake cylinder pipe 34; and by a pipe 52 to emergency reservoir 28. All of the above-described pipe connections may include various T fittings which are common in the art and have not been specifically identified. As an alternative, BCPMV 44 may include a reservoir charging check valve, eliminating this construction from the ABDW valve and thus the volume reservoir will be connected directly to the BCPMV 44 without a connection to the ABDW valve. Further, in the alternate construction, there is no direction connection from valve 44 to brake pipe 10, but instead this connection is through the ABDW valve. The alternate construction described is illustrated more particularly in FIGS. 7 and 8.

The BCPMV 44 is indicated in detail in FIGS. 2–6 and includes an outer housing 54. A port 56 is connected to pipe 46 and thus to volume reservoir 38. A port 58, at the center of the housing, is connected to pipe 52 and emergency reservoir 28. A port 60 is connected to pipe 48 and brake pipe 10. Last, a port 62 is connected to pipe 50 and brake cylinder pipe 34. It should be understood, although not shown herein, that the brake cylinders 31 and 33 are mounted on the customary pair of trucks supporting the railroad car truck body.

A piston assembly indicated generally at 64 is movable within housing 54 and includes a piston member 66, the upper surface of which is covered by a diaphragm 68, the outer periphery of which is sealed between mating sections of housing 54. The diaphragm and piston member are held together by a plate 70 which supports the head 73 of a screw and nut combination 74 which engages piston rod 75.

Piston assembly 64 is essentially an elongated rod having the described piston member 66 at the upper end and a lower piston member 72 near the opposite or lower end. Piston member 72 is attached to the elongated rod 75 by a lower diaphragm 76, again held in position by mating sections of housing 54. A plate 78 and a screw 80 are used to firmly attach piston member 72 to rod 75 and to the diaphragm. The lower end of the piston assembly is positioned upon a coil spring 90 which is bottomed upon the housing and normally urges the entire piston assembly in an upward direction.

The lower portion of the valve includes a diaphragm 98 with the periphery being held in position by mating sections of the housing. A piston 92 engages the underneath side of the diaphragm and is urged against the diaphragm by a spring 94, which in turn, biases the diaphragm against valve seat 96. A passage 100, connected to volume reservoir port 56, is in communication, through an equalizing passage 104 in the diaphragm with a chamber 110 beneath the diaphragm. In like manner passage 100 is in communication with a chamber 106 which is beneath the piston assembly and contains coil spring 90. Passage 100 is only in communication with chamber 106 when the diaphragm is not positioned against valve seat 96. Brake cylinder pipe 50, through port 62, is also in communication with chamber 106 through a passage 108.

The upper end of piston assembly 64 defines two chambers. The first, indicated at 114, is beneath piston member 66 and is in communication with the brake pipe through passage 116 and port 60. The second chamber, above piston member 66 and indicated at 118, is in communication with the emergency reservoir through port 58.

The structure is completed by various seal rings which isolate the described chambers as is conventional in construction of the present type.

In the normal static position of the valve when the car brakes are not in an operated or applied condition, air enters chamber 114 through brake pipe port 60. Air enters chamber 118 through emergency reservoir port 58. Air from the volume reservoir enters port 56 and passes into chamber 110, through diaphragm passage 104, but does not go beyond that point as diaphragm valve member 98 is held in a position to seal entrance into chamber 106 by coil spring 94. This is assuming that the piston assembly 64 is in the position shown in which the lower end of screw 80 is not in contact with the top of diaphragm valve member 98. The pressure in chambers 114 and 118 is equal and the normal downward thrust upon the piston assembly caused by the greater pressure receiving area on top of plate 70 is balanced by the force of coil spring 90 at the bottom of the piston assembly. Thus, the piston assembly will remain in the static position shown in FIG. 2 when the brakes are not operated.

Under a normal brake application, the air in chamber 114 is reduced as brake pipe pressure is reduced and in proportion to the desired brake cylinder pressure. This will cause piston assembly 64 to move downward, due to the greater pressure in chamber 118. At the same time, pressure or air from the brake cylinder enters the valve body through port 62 and passage 108 and is, therefore, present in chamber 106. Assuming brake cylinder air is available in sufficient pressure in chamber 106, piston assembly 64 will rise to the static position illustrated in FIG. 3. In this instance, the volume reservoir does not provide any additional air for brake operation.

In the event an additional volume of air is required to increase brake cylinder air to the desired level for appropriate brake application, as the air in chamber 114 is reduced, causing the piston assembly to move downward, if there is not sufficient air available at brake cylinder port 62 to cause the piston assembly to rise, the continued downward movement of the piston assembly will cause the end of screw 80 to move diaphragm valve member 98 to unseat with the effect that the air available at port 56 connected to the volume reservoir will then flow through passage 100 into chamber 106. This communication with the volume reservoir will remain until there is sufficient pressure in chamber 106 to cause piston assembly 64 to again rise to the static position which will permit closure of diaphragm valve 98. Thus, in any instance in which brake cylinder air is not of a sufficient pressure to cause effective operation of the brakes, such condition normally being caused by worn shoes and the consequent excessive brake cylinder piston travel, additional air is supplied by the volume reservoir in the manner described to the point that there is the required and appropriate amount of air pressure available.

The above-described sequence of operation pertains to normal brake application. Application of the brake in an emergency mode is essentially the same, with the primary difference being the fact that pressure in chamber 114, which is connected to the brake pipe, effectively is reduced to zero. This causes piston assembly 64 to move downward opening valve 96, as described above, which permits volume reservoir air to enter into chamber 106, causing an increase in brake cylinder pressure. The piston assembly will not move up to the normal static position shown until there is an increase in brake pipe pressure in chamber 114.

The various areas which provide the air pressure responsive forces on piston assembly 64 and the value for coil spring 90 are so chosen that a minimum operating pressure will always be provided in the brake cylinder pipe. This pressure may be chosen at any particular level, depending upon the type of car and other factors which affect the necessary brake cylinder pressure. The important point is that the brake cylinder piston travel may be longer than in customary truck-mounted brakes because the volume reservoir will provide the additional necessary air to compensate for the longer piston stroke.

FIGS. 7 and 8 illustrate a variant form of brake cylinder pressure maintaining valve, as described above, in which the reservoir charging check valve is a part of the BCPMV. The valve in FIGS. 7 and 8 has a housing 200 with a port 202 connected to the brake cylinder pipe; a port 204 connected to the emergency reservoir; a port 206 connected to the volume reservoir; and a port, which is behind port 204, but which will be connected to the brake pipe and will be connected to a passage 208 opening into a chamber to be designated hereinafter.

Within housing 200 there is a piston 210 mounted to a diaphragm 212 the periphery of which is held between mating sections of the housing, with the diaphragm being attached to the piston by a plate 214 and a threaded nut and screw 216. Coaxially arranged with piston 210 is a shaft 218 which moves within a sleeve 220 fixed within the housing. Piston 210 has a screw head 222 which extends within a recess 224 of the shaft and is used to coaxially move the shaft as will be described. Shaft 218 has a generally central passage 226 which communicates with a lateral passage 228 in turn in communication with an exterior recess 230 on the shaft. Recess 230 connects to a passage 232 in the housing. The shaft has a pair of seals 234 and 236 which seal opposite ends of recess 230.

Attached to one end of shaft 218 is a second piston 238 having a diaphragm 240 attached thereto with the diaphragm being peripherally attached to mating portions of the housing. Beneath the diaphragm is a chamber 242 within which is positioned a coil spring 244 with the spring urging piston 238 and thus shaft 218 in an upward direction toward piston 210.

Piston 238 carries an extension 246 which is positioned above and in alignment with a diaphragm 248 movable by a piston 250 with the piston having a stem 252 positioned within a socket 254 of the housing and encircled by a coil spring 256. As will be appreciated, many of the parts described herein are similar to the parts illustrated in the construction of FIGS. 3–6.

Passage 232 in housing 200 has an enlarged portion 258 communicating with a chamber 260 through a ball check 262 biased to a closing position by a small coil spring 264. A seat member 266 functions with ball check 262 to close the above described passage. Beneath ball check 262 there is a passage 268 which opens into the area above diaphragm 248 and outside of seat 248a. Passage 268 communicates with the area beneath diaphragm 248 by means of diaphragm passage 249.

Emergency reservoir port 204 is in communication with the space above piston 210 by means of a series of passages generally designated 270. In like manner passage 208, connected to the brake pipe is in communication with the chamber beneath piston 210. Volume reservoir port 206 communicates with the space above diaphragm 248 by a series of passages, particularly illustrated in FIG. 8 and generally designated by number 272. Finally brake cylinder port 202 is connected to a passage, illustrated in dotted lines in FIG. 7 and designated 274 which has a ball check 276 positioned within a chamber 278, with a coil spring 280 urging the ball check against a seat member 282. Beyond ball check 276 there is a passage 284 which connects the brake cylinder pipe with chamber 242, when the ball check is removed from its seat.

The operation of the valve of FIG. 7 and 8 while similar to that shown in FIGS. 2–6, does have some variation. When the valve is initially charged, brake pipe air will pass through passage 208 into the chamber beneath piston 210. This air will flow into passage 226, through lateral passage 228, and assuming the shaft is in the position of FIG. 7, into passage 232 and 258, moving ball check 262 from its seat so that the in flowing air communicates through passage 268 with the space above diaphragm 248. Thus air from the brake pipe is in communication with passage 272 and with the volume reservoir to thereby charge the volume reservoir.

Simultaneously emergency reservoir air enters the chamber above piston 210 through port 204 and passage 270. As the air pressures in the brake pipe, the volume reservoir and the emergency reservoir equalize, air flow will cease through passages 258 and 268 which are separated by ball check 262. In this position of the valve there is still communication from the brake pipe chamber with the upper end of ball check 262 and from the lower end of the ball check to the volume reservoir, however as these pressures have equalized the ball check will be closed by spring 264.

When the brakes are applied, brake pipe pressure is first reduced causing piston 210 to move downward causing piston seal 231 to seal against shaft seat 233, stopping any further flow of air into passages 232 and 258. Brake cylinder pressure will enter port 202 and be present above ball check 276. As there is a continued reduction in brake pipe pressure, in the normal brake application, piston 210 will continue to move toward shaft 218 and will ultimately cause downward movement of the shaft unseating diaphragm 248 from its housing seat 248a. This places volume reservoir passage 272 in communication with chamber 242 and thus with passage 284 leading to the lower end of ball check 276. Accordingly, volume reservoir air may unseat ball check 276 allowing volume reservoir air to flow into the brake cylinder for use in applying the brakes. As brake cylinder pressure increases, the pressure in chamber 242 will increase with the force created by the air pressure in that chamber combining with the force of spring 244 to move piston 238 and thus shaft 218 in an upward direction. This permits diaphragm 248 to close on its seat 248a stopping the further flow of volume reservoir air to the brake cylinder. Ball check 276 will again close preventing further flow of air from passage 284 to passage 274. Ball check 276 may only open for a short period of time, depending upon the air pressure available in the brake cylinder line 34 of FIG. 1.

Once the brakes have been released the volume reservoir will again charge if there is any substantial difference in pressures between the brake pipe, volume reservoir and emergency reservoir as described above. Assuming that little or no volume reservoir air was needed to complete a brake application, there will be no necessity to recharge the volume reservoir. Also the volume reservoir will not recharge as long as the brakes are applied since application of the brakes causes seal 231 to seat upon shaft seat 233.

The structure of FIGS. 7 and 8 provides communication between the volume reservoir and the brake cylinder only if brake cylinder pressure is sufficiently below volume reservoir pressure to permit the unseating of ball check 276. If these pressures are equalized, an indication that no volume or reservoir pressure is needed to complete a brake application, the ball check will remain closed. The structure of FIGS. 7 and 8 differs from that in FIGS. 2–6 in that in every brake application there is an unseating of diaphragm 248 which permits volume reservoir pressure to be available beneath piston 238 and thus beneath the ball check providing communication with the brake cylinder. Again only if there is a difference between volume reservoir pressure and brake cylinder pressure, will the ball check open permitting additional air to flow to the brake cylinder for brake application.

Whereas the preferred form of the invention has been shown and described herein, it should be realized that there may be many modifications, substitutions and alterations thereto.

The embodiments of the invention in which an exclusive property or privilege is claimed are defined as follows:

1. A railroad air brake system for truckmounted brakes including an ABDW valve and auxiliary and emergency reservoirs with pipe connections therebetween, a brake pipe and a connection between said brake pipe and ABDW valve, a truck mounted brake cylinder located at each truck and brake cylinder pipe connecting said brake cylinders with the ABDW valve, the improvement comprising a volume reservoir, a brake cylinder pressure maintaining valve (BCPMV) connected to the brake pipe, brake cylinder pipe, volume reservoir and emergency reservoir, said BCPMV including a piston assembly movable in response to pressure in said volume reservoir, emergency reservoir and brake pipe, valve means controlling communication between said volume reservoir and the brake cylinder pipe, with said piston assembly controlling operation of said valve means, said valve means opening responsive to the pressure difference between said brake cylinder pipe and volume reservoir whereby said BCPMV operates to supply air from said volume reservoir to said brake cylinder pipe when the pressure in the brake cylinder pipe drops below the pressure in said volume reservoir by a predetermined amount.

2. The structure of claim 1 further characterized in that said BCPMV includes a first chamber in communication with said emergency reservoir, a second chamber in communication with said brake pipe, and a third chamber in communication with said brake cylinder pipe, pressure in said second and third chambers acting in one direction on said piston assembly, with pressure in said first chamber acting in a contrary direction on said piston assembly.

3. The structure of claim 2 further characterized by and including a spring within said BCPMV and urging said piston assembly in a direction contrary to that of pressure in said first chamber.

4. The structure of claim 3 further characterized in that said piston assembly is positioned for mechanical contact with said valve means, with movement of said piston assembly responsive to pressure in said first chamber being effective to unseat said valve means and permit communication between said volume reservoir and said third chamber.

5. A brake cylinder pressure maintaining valve including a housing, a piston assembly movable in said housing, an emergency reservoir port in said housing in communication with a first housing chamber, a brake pipe port in said housing in communication with a second housing chamber, a brake cylinder pipe port in said housing in communication with a third housing chamber, a volume reservoir port in said housing and a passage connecting said volume reservoir port with said third chamber, valve means in said passage with the opening and closing of said valve means controlling the flow of air from said volume reservoir port to said brake cylinder pipe port, said valve means being operable in response to movement of said piston assembly, which movement is controlled by pressure in said first, second and third chambers whereby pressure is supplied from said volume reservoir port to said brake cylinder port when there is a predetermined pressure difference between said brake cylinder and said volume reservoir.

6. The structure of claim 5 further characterized in that pressures in said second and third chambers urge said piston assembly to a position maintaining said valve means in a closed position, with pressure in said first chamber urging said piston assembly to move said valve means toward an open position.

7. The structure of claim 6 further characterized by and including spring means urging said piston assembly toward a valve closed position.

8. The structure of claim 5 further characterized in that said valve means includes a valve seat, a movable valve member spring-biased toward a closing position with said seat, and cooperating means on said piston assembly and movable valve member for causing movement of said valve member relative to said seat.

9. The structure of claim 8 further characterized in that piston assembly includes a piston member and a rod, said piston member separating said first and second chambers.

10. A railroad air brake system for truck mounted brakes including an ABDW valve and auxiliary and emergency reservoirs with pipe connections therebetween, a brake pipe and a connection between said brake pipe and ABDW valve, a truck mounted brake cylinder located at each truck and a brake cylinder pipe connecting said brake cylinders with the ABDW valve, the improvement comprising a volume reservoir, a brake cylinder pressure maintaining valve (BCPMV) connected to the brake pipe, brake cylinder pipe, volume reservoir and emergency reservoir, said BCPMV including valve means controlling communication between said volume reservoir and the brake cylinder pipe, said valve means opening responsive to the pressure difference between said brake cylinder pipe and volume reservoir whereby said BCPMV operates to supply air from said volume reservoir to said brake cylinder pipe when the pressure in the brake cylinder pipe drops below the pressure in said volume reservoir by a predetermined amount.

* * * * *